Nov. 19, 1968  P. MAYMONT ETAL  3,411,250
DWELLING WITH LEG SUPPORT ELEMENTS
Filed Aug. 2, 1965  5 Sheets-Sheet 1
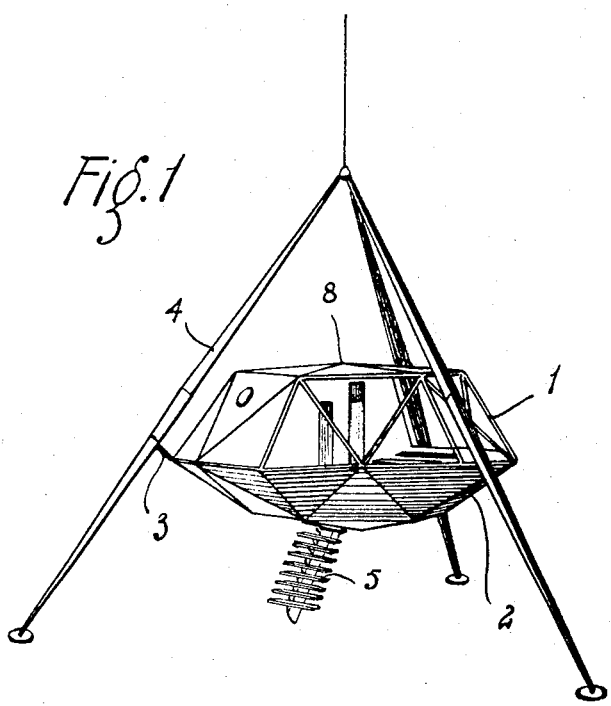
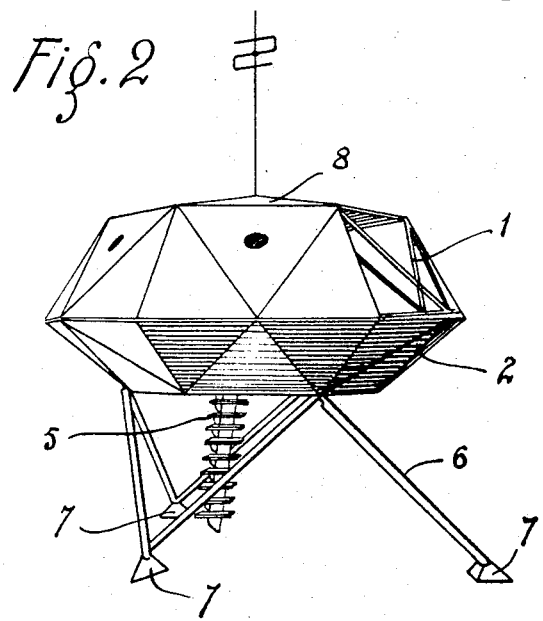
INVENTORS
PAUL ERNEST MAYMONT
JEAN ZORBIBE
By Young + Thompson
ATTYS.

Nov. 19, 1968　　　　　P. MAYMONT ET AL　　　　3,411,250
DWELLING WITH LEG SUPPORT ELEMENTS
Filed Aug. 2, 1965　　　　　　　　　　　　5 Sheets-Sheet 2
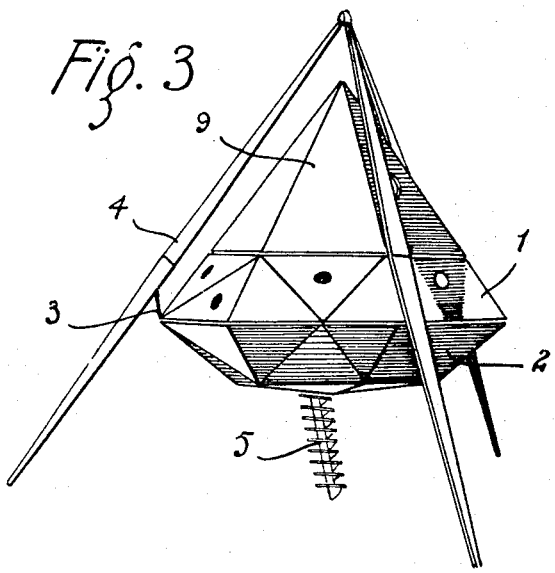
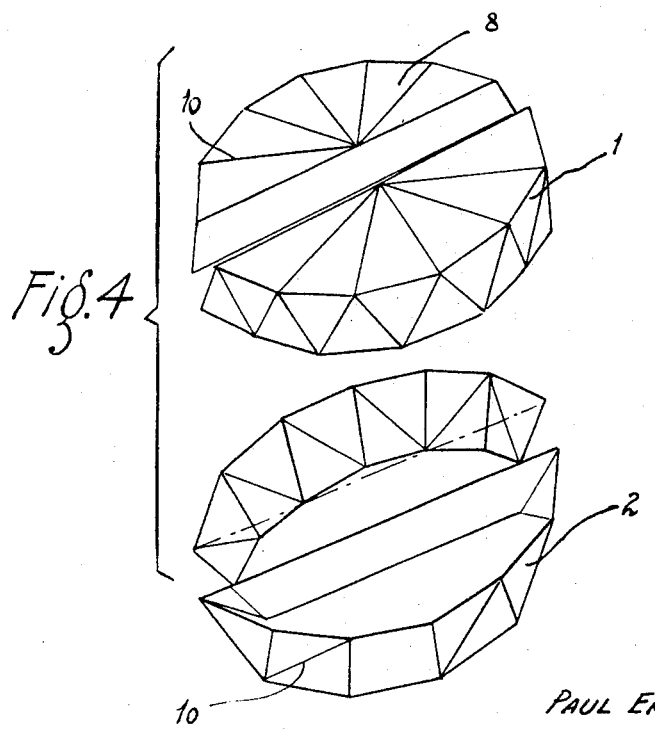
INVENTORS
PAUL ERNEST MAYMONT
JEAN ZORBIBE
BY Young & Thompson
Attys Nov. 19, 1968  P. MAYMONT ET AL  3,411,250
DWELLING WITH LEG SUPPORT ELEMENTS
Filed Aug. 2, 1965  5 Sheets-Sheet 3
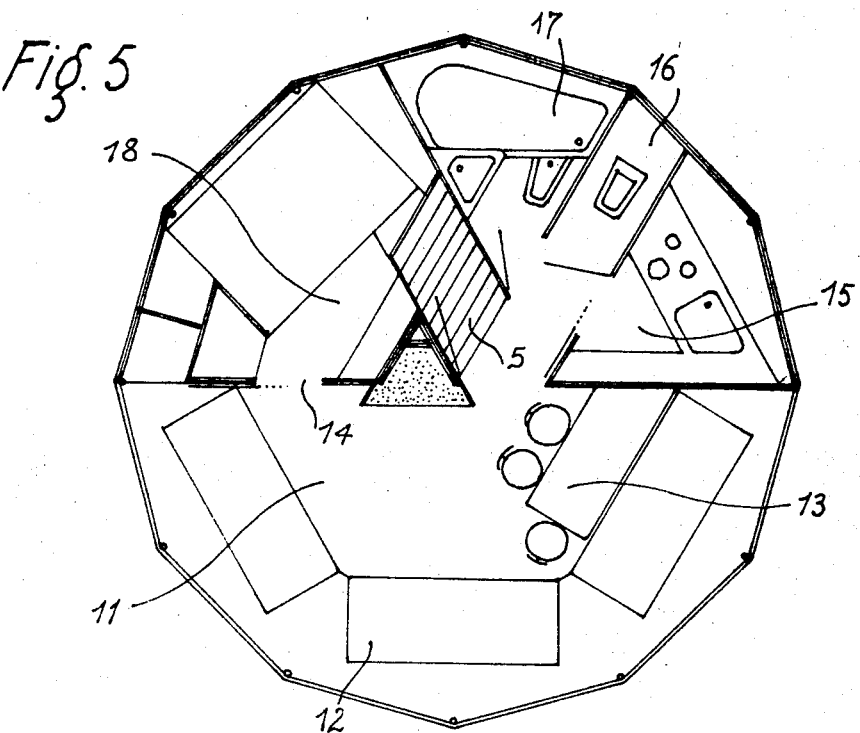
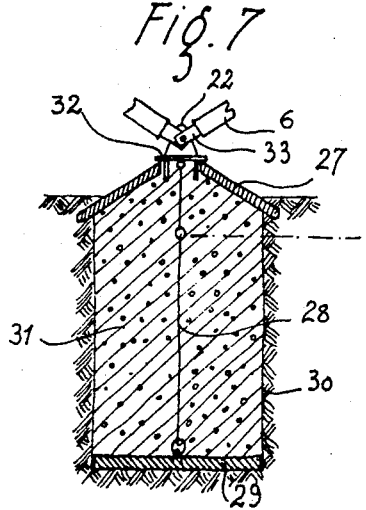
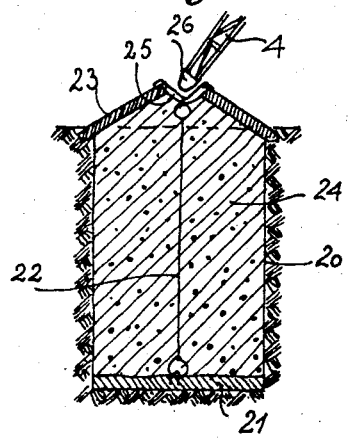
INVENTORS
PAUL ERNEST MAYMONT
JEAN ZORBIBE
BY Young + Thompson
ATTYS.

United States Patent Office 3,411,250
Patented Nov. 19, 1968

3,411,250
DWELLING WITH LEG SUPPORT ELEMENTS
Paul Maymont, 49 Rue de Pontieu, Paris 8eme, France, and Jean Zorbibe, 15 Ave. Victor Hugo, Paris 15, France
Filed Aug. 2, 1965, Ser. No. 476,573
Claims priority, application France, Aug. 5, 1964, 984,208
6 Claims. (Cl. 52—81)

ABSTRACT OF THE DISCLOSURE

A dwelling is constructed from a plurality of triangular panels interconnected along their edges. The dwelling has a flat bottom, and the triangular panels form the sides of the cup-shaped halves of the dwelling that are joined along a horizontal midplane. The dwelling is supported on three legs, each of which is formed by two bars; and each bar forms an apex with an adjacent bar at its upper and lower ends so that the bars are disposed in zigzag fashion.

Summary of the invention

A dwelling house according to this invention comprises a pair of superposed shells having a relatively flat horizontal bottom and sides comprised by a plurality of triangular panels interconnected at their edges The dwelling house is supported on three legs each comprised by two bars disposed at an angle to each other and forming apices at their ground-engaging ends and secured to the bottom of one of the shells at their upper ends.

The present invention has for its object a method of construction of buildings for habitation which is capable of having many applications. It makes it possible to construct detached country or holiday houses under convenient and economical conditions. It can however also be employed to form units.

In accordance with this method of construction, the dwelling house is constituted by pre-fabricated shells which are assembled together to form a complete house. The assembled shells are fixed to a support. The dwelling house can be suspended from this support or it may be carried by the support.

The shells are arranged so as to form a house of several rooms with their necessary amenities: living-room, bedroom, kitchen, bathroom, etc. These shells may have any shape, such as ellipsoidal of polyhedral caps. In particular, the polyhedral shape with a flat bottom or a slight slope lends itself to convenient construction in panels.

In caps of a single piece or in panels, the shells constituting the dwelling house are formed by a lattice of reinforcements, on which are fixed the full walls, opaque or transparent. Reinforcing members and walls are preferably of light materials: light metals or alloys for the reinforcing members, elements of plastic material, metal panels, plywood, etc. for the walls. As an alternative, the panels may be self-supporting and assembled together like the staves of a barrel by tensioned cables or by any other system. In this way there is obtained a light unit of pre-fabricated elements, easy to transport and particularly simple and rapid to erect.

The advantages and applications of the invention will be more fully described with reference to the accompanying drawings, in which:

FIG. 1 shows in perspective a house according to the invention, in the suspended arrangement;

FIG. 2 shows a perspective view of a similar house carried by a support;

FIG. 3 is an alternative form of FIG. 1;

FIG. 4 is a perspective view of the shells which constitute the building;

FIG. 5 shows in plan an example of the interior arrangement of the dwelling house according to the invention;

FIG. 6 represents in cross-section a form of construction of a supporting seating for the building;

FIG. 7 shows an alternative form of seating in cross-section;

Figure 8:
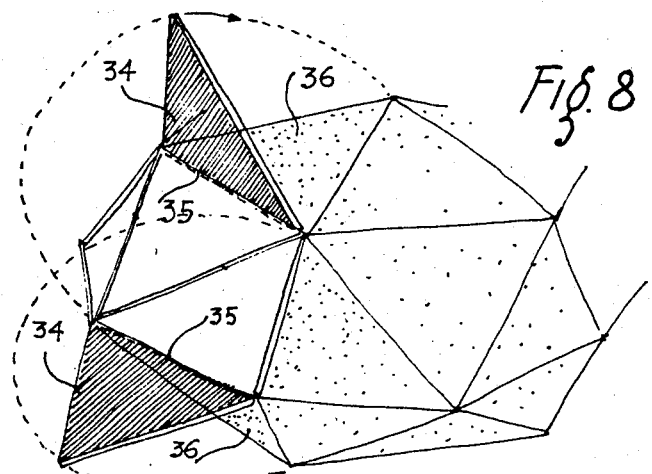
FIG. 8 is a diagram explaining the arrangement of the shutters of the building of FIGS. 1 to 3.

The dwelling house according to the invention is constituted by shells 1 and 2 assembled together and arranged internally, the whole constituting an indeformable block. This unit 1-2 is suspended by suitable attachments 3 from a tripod support 4. This house is prepared in elements which are brought on to site in sections and assembled before being mounted on their support. The unit 1-2 does not rest on the ground but remains spaced apart from it. Access to the house is provided by a removable staircase 5.

The attachments 3 can advantageously be constituted by etastic and/or deformable means such as springs, shock-absorbers, etc. There is then obtained a unit which is proof against earthquake shocks.

Instead of being suspended from a tripod as in FIG. 1, the house 1-2 formed of shells can be placed as shown in FIG. 2 on a support 6 constituted for example by a triangular assembly resting on the ground by means of feet 7. In an alternative form, a unit of this kind can rest on the ground on its summit forming a single point of support, the whole being cross-braced by a system of stays.

The construction shown in FIGS. 1 and 2 lends itself to the fabrication of a country house such as a holiday bungalow. In sunny regions, the roof has only a slight slope as indicated at 8. For a house intended for mountain regions, for winter sports, the unit 1-2 is surmounted by a roof added on and pointed for the evacuation of snow (see FIG 3).

The shells 1 and 2 intended to constitute the house are composed, depending on the dimensions of the house to be built, of one or more parts assembled together. For example, each of the shells can be divided as shown into two portions intended to be joined together along a diametral plane. It is possible to provide a greater number of parts to be assembled together, according to the circumstances: facilities for construction, conditions of transport, necessities of erection.

These shells may have the most varied shapes. In the example shown, they are in the shape of half-polyhedrons. Each of these is composed of a reinforcement frame formed of tubes 10 mounted in triangles assembled together at their extremities. On the triangles thus constituted by the tubes 10 are mounted panels 11 which form the walls. These panels are either elements with double walls with an intercalated insulating material, or transparent panels performing the function of windows.

The assembly of the shells or their parts is effected by any appropriate means: bolting, welding, sticking, etc., coupling together the reinforcement elements. Appropriate joints such as rolls or tubes of rubber or plastic material, inflatable when so desired, are arranged between the assembled elements to give water-tightness.

FIG. 5 shows an example of the internal arrangement of the dwelling house thus constituted. There are provided: a living-room 11, the walls of which in transparent panels are left substantially free; this room with a chimney or fire-place may be provided with a divan 12 forming beds, a table 13; separated from the living-room 11 by a partition 14, there is the kitchen 15, a lavatory 16, a bathroom 17, and a bedroom 18. Any other interior arrangement can of course be chosen according to the wishes of the user.

The various interior elements, partitions, kitchen unit, sanitary unit, etc., are manufactured in elements prepared in advance and mounted in the shells forming the framework and the walls of the house and are assembled with these latter in any appropriate manner.

The house described and shown is built without foundations of the usual type. Whether it is suspended or supported, it rests on a tripod or other device which is mounted on simple blocks of concrete.

Examples of construction of such blocks are shown in FIGS. 6 and 7. In FIG. 6, there is shown a block which receives the masts of the three-legged support of FIGS. 1 and 3. In a hole 20 dug or cut in the ground, there is arranged a plate 21 to which is anchored by a cable 22 a cap 23. The space included between the cap 23 and the plate 21 is packed with a filling of earth, sand or concrete 24. The cap 23 is provided with a seating 25 which serves as a support for the foot 26 of the tripod 4.

In the case of a support for the house shown in FIG. 2, the supporting block (see FIG. 7) is produced similarly and comprises a cap 27 anchored by a cable 28 to a plate 29 arranged at the bottom of a hole 30 packed with earth, concrete or sand 31. The cap 27 is provided with lugs 32 to which the bars 6 of the support are attached at 33.

Any other equivalent arrangements may be utilized to receive the tripod support of the house.

The erection of this house is particularly easy, and is not influenced by any considerations due to the ground.

In other words, a house of this kind can be easily and rapidly built in any position, even with a difficult access, in the mountains, on steep slopes, etc. The shells or other parts of the house are prepared in elements of dimensions which lend themselves to transport by any means: railway, lorry, helicopter. When the elements have been brought on site, the work consists of a simple assembly which is all the more easy and rapid as the elements are of larger size.

The house constituted by polyhedral shells, especially with triangular faces, enables transparent faces to be provided so as to constitute the windows. Shutters are advantageously added to these transparent faces. The triangular shape, and preferably of equilateral triangles, enables shutters 34 to be provided which are pivoted along one edge 35 and fold back against an adjacent opaque face 36.

The dwelling house thus designed is equipped with conduits for the supply of water and for evacuation of waste water, which can be flexible pipes associated with the movable staircase 5 or attached to the feet 6 or the support.

The construction such as described for a separate or detached house can be applied to units in various ways.

Figure 9:
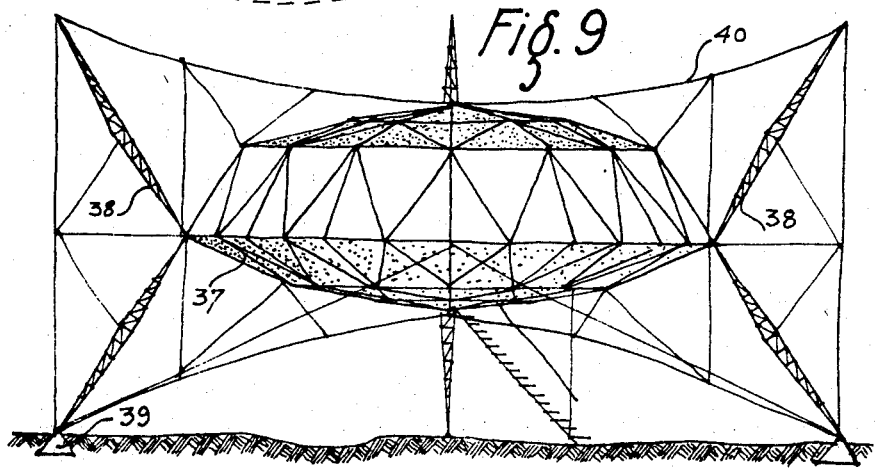
FIG. 9 shows in elevation a further construction of the house according to the invention.

First of all, it is possible to build a single unit of shells and parts of shells such as shown in FIG. 9.

By means of shells of assembled elements with their internal fittings and arrangements, there is formed a dwelling house 37 with one or several floors, of generally lenticular shape, attached to a series of supporting masts 38 of triangular form, radiating outwards. These masts rest on supporting blocks 39 and are joined together in a practically indeformable unit by a network of stays or cables 40.

Figure 10:
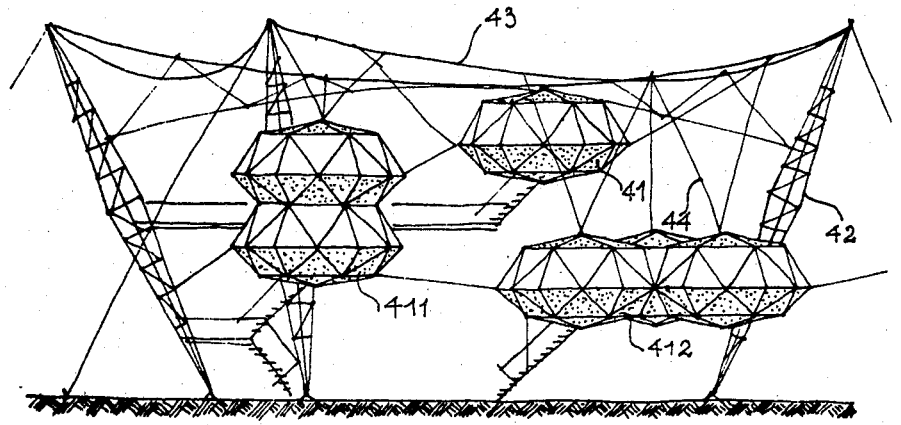
FIGS. 10 to 13 show diagrammatically the arrangement of dwelilng units in accordance with the invention.

In accordance with this method of construction however, it is possible to constitute a group forming an agglomeration, by means of a plurality of individual houses 41 of the type previously described, attached to a general support formed by masts 42 and cables 43 and 44 (see FIG. 10). With this solution, individual houses are put at the disposal of the occupants while at the same time providing the common services, water, electricity, etc., for the whole group. Two or more individual houses 41 may be assembled together, either vertically by superposition, as indicated at 411, to constitute a house with several storeys, or horizontally by placing together as indicated at 412.

Figure 11:
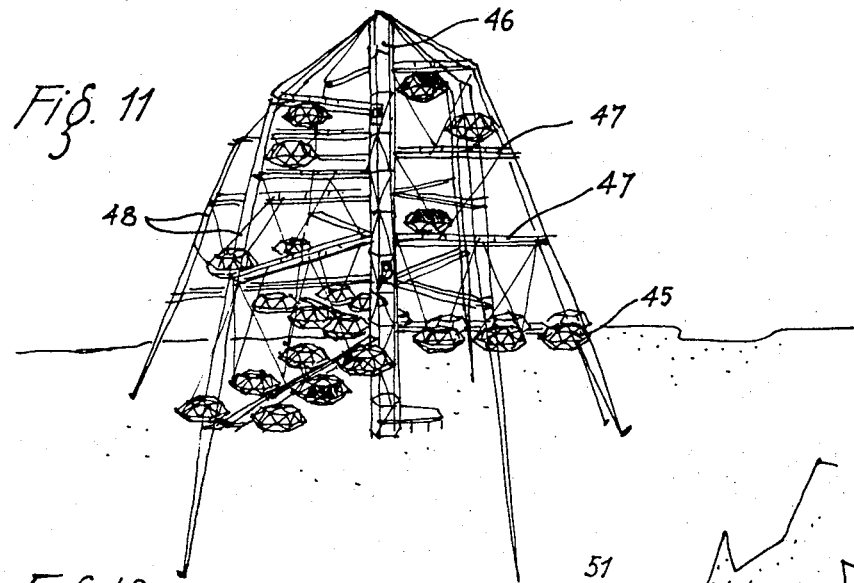

According to a further arrangement shown in FIG. 11, the individual houses 45 are mounted on a framework constituted by a central mast 46 serving as a passage for the lifts and also for the conduits, with radiating arms 47 forming access corridors, and cables 48.

These arrangements lend themselves to the construction of groups in new towns, and are adaptable to a large number of local circumstances.

Figure 12:
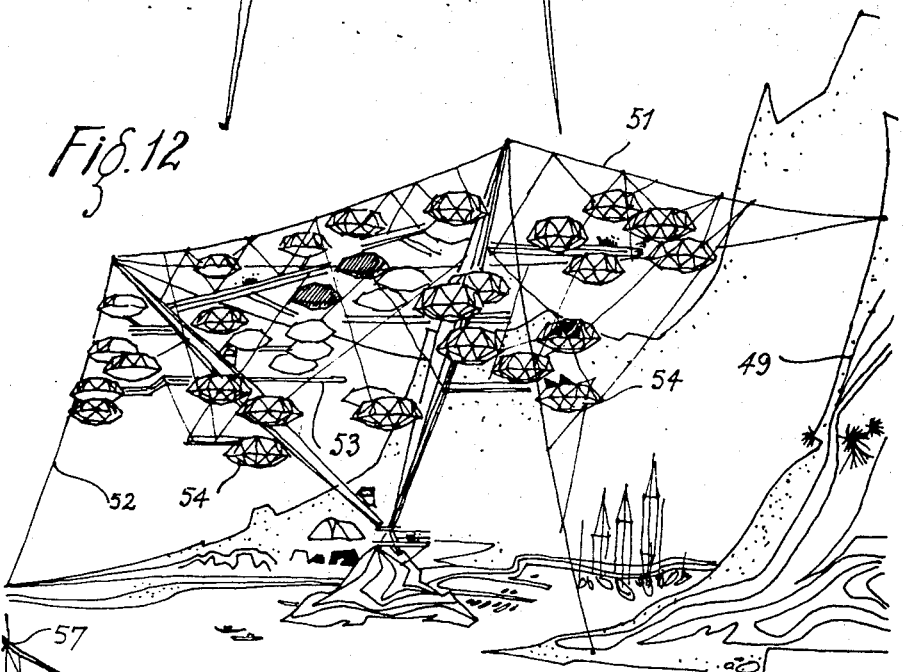
Figure 13:
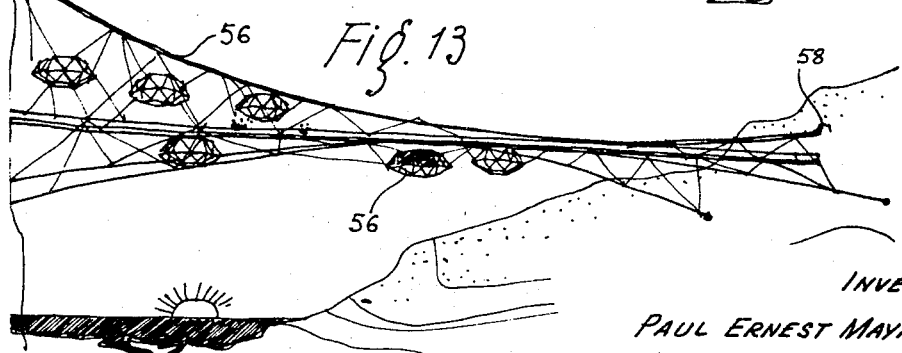

Thus, in particular, there may be designed a group of dwellings constructed on the side of a cliff 49 (see FIG. 12). One or a number of masts 50 attached to the cliff by cables 51 and 52 carry horizontal arms 53 from which are suspended the individual or collective dwelling houses 54. There is thus constituted a particularly attractive station with uninterrupted views, under economical conditions.

Another solution consists of suspending the houses 55 from a cable 56 similar to a suspension bridge cable of the quadricable type for example, fixed at its two extremists 57 and 58 above a valley, a ravine or a river. Under these conditions, access to the houses is effected by the bridge or foot-bridge to which they have been attached.

These applications are not limitations. As can be seen, the construction according to the invention offers various possibilities of execution of units with individual or collective elements.

What we claim is:

1. A dwelling house comprising two superposed shells, each said shell having a relatively flat horizontal bottom and lateral polyhedric portions comprised by mutually assembled triangular panels interconnected along their adjacent edges, and support means for said house comprising three legs each formed by two bars disposed at an angle to each other and forming apices at their ground-engaging ends, said bars being secured to the bottom of one said shells at their upper ends.

2. A dwelling house as claimed in claim 1, said bars at their upper ends forming apices with each other.

3. A dwelling house as claimed in claim 1, a portion of said triangular panels being transparent.

4. A dwelling house as claimed in claim 1, certain of said triangular panels being pivotally mounted along their edges to provide shutters for the house.

5. A dwelling house as claimed in claim 1, said two shells being secured together along a horizontal midplane.

6. A dwelling house as claimed in claim 5, the upper edge of the lower of said superposed shells and the lower edge of the upper of said superposed shells lying substantially entirely in said horizontal midplane.

References Cited

UNITED STATES PATENTS

| | | |
|---|---|---|
| 2,796,877 | 6/1957 | Berseth. |
| 3,018,855 | 1/1962 | Finlayson _____ 52—81 |
| 3,226,727 | 12/1965 | Frey _____ 52—82 X |
| 3,284,970 | 11/1966 | Stowasser _____ 52—80 |

FOREIGN PATENTS

| | | |
|---|---|---|
| 1,269,321 | 7/1961 | France. |
| 1,362,650 | 4/1964 | France. |

OTHER REFERENCES

Civil Engineering, October 1959.

JOHN E. MURTAGH, *Primary Examiner.*